Oct. 15, 1935.   L. H. ELMER   2,017,308

PLANT CONTAINER

Filed Oct. 20, 1934

INVENTOR.
LEON H. ELMER
BY
Miller Boyken & Bried
ATTORNEYS.

Patented Oct. 15, 1935

2,017,308

UNITED STATES PATENT OFFICE 2,017,308

PLANT CONTAINER

Leon H. Elmer, San Jose, Calif.

Application October 20, 1934, Serial No. 749,266

4 Claims. (Cl. 47—37)

This invention relates to plant pots and has for its objects an improved pot or container including a cover therefor adapted to enclose the roots of a plant therein together with a quantity of material in which the roots are embedded, such as peat or suitable fibrous material and soil or moss or the like, and the container is constructed to permit the stalk of the plant to project therefrom. Also another object of the invention is to provide a construction in which the plant roots can be quickly packed in the container and the cover plate secured around the stalk and over the open end of the container in a manner to secure the peat and soil closely packed around the roots against escape from the pot, and which construction provides for a coaction between the pot and cover to provide a receptacle over the roots for receiving water and distributing the water to the roots. Other objects and advantages will appear in the specification.

In the drawing Fig. 1 represents a plant projecting from my container with the roots embedded in a combination of soil and peat within the container. The container including its cover are shown in section.

In detail, the container (Fig. 1) comprises an open-ended cylindrical, tubular body 1 of sheet metal, preferably of black iron, provided with a removable bottom 2 having a flange 3 adapted to snugly fit over the lower end of the tubular body. Since the body and bottom closely resemble a can with an open upper end, the term "can" will be used in the following description. The upper end of the can is rolled over at 4 and a short distance below the upper end the sides are pressed inwardly to provide an inwardly projecting ring 5 extending circumferentially around the can.

Figure 1:
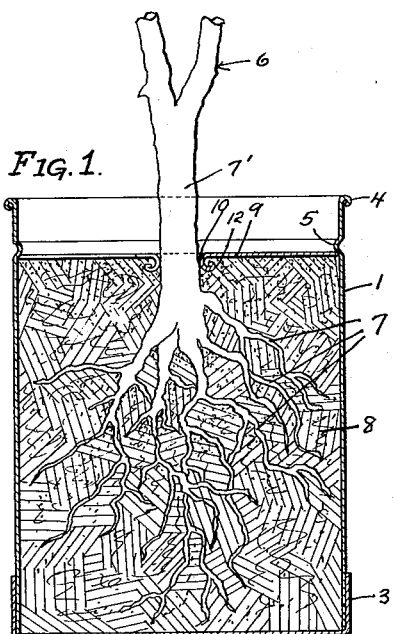

A plant 6, such as a rose plant, for example, is positioned with its roots 7 within the can, the stalk 7' projecting outwardly of the open upper end thereof, and a mixture 8, preferably of peat and soil, is then firmly packed around the roots to about the level of ring 5, or preferably slightly above the ring, and a circular cover plate 9 of the same material as the can is slipped around the stalk of the plant and is pressed downwardly on the peat and soil until the edges of the cover spring over and past the ring to below it as indicated in Fig. 1. The cover 9 is of a diameter substantially equal to the inside diameter of the can, so that when it springs over the ring it engages below the ring at its edges against withdrawal from the can and is tightly held in this position due to the springy characteristic of the peat or similar springy fibrous material suitable for packing around the plant roots.

In the foregoing condition, with the cover in place within the can, the stalk 7' extends through a central opening 10 formed in the cover. The edges of the opening 10 may be turned radially outwardly of the axis of the cover as at 12 to insure a smooth edge adjacent the stalk to prevent injury to said stalk, since the edges of the opening are adapted to fairly closely embrace the stalk, in which case none of the material within the can can escape from the upper end of the can nor can the material in which the roots are packed become dislodged relative to the roots, and the plant together with the can may be handled freely as a unit without danger of injury to the plant or spilling of soil and peat.

Figure 4:
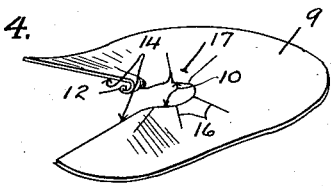
Fig. 4 is a perspective view of the cover shown in Fig. 2, in which the cover is distorted slightly for slipping around the plant stalk.
Figure 5:
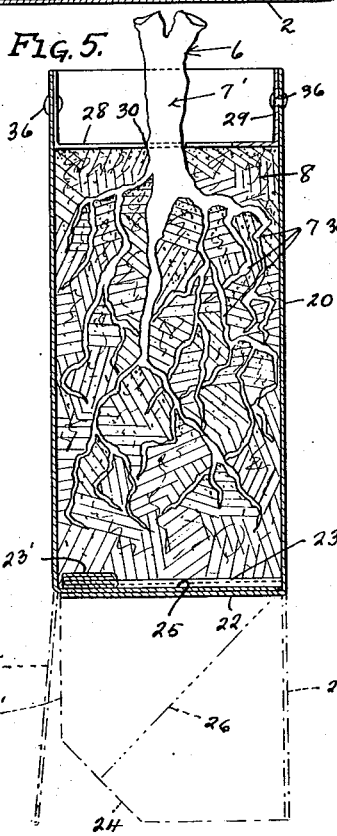
Fig. 5 is a view of plant projecting from a modified form of container with the roots embedded in material similar to that indicated in Fig. 1. The container and cover are shown in section and the bottom of the container is shown closed in full line and dotted lines indicate the bottom when opened.
Figure 6:
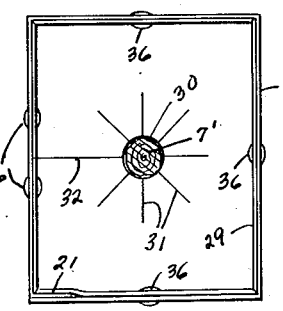
Fig. 6 is a plan view of the top of the container of Fig. 5 with the stalk shown in section.
Figure 7:
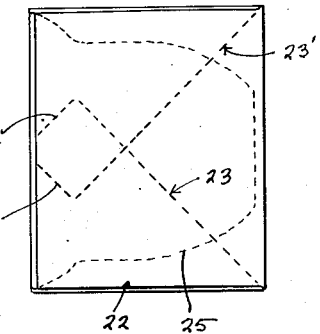
Fig. 7 is a plan view of the bottom of the container of Fig. 5.

In order to quickly assemble the can and cover, the cover is cut through along line 13 which extends radially of the axis of the cover from the central opening to the edge thereof. The portions of the cover on opposite sides of this cut may then be sprung oppositely as indicated in Fig. 4, thus providing a relatively large space or passage 14 between the separated edges of the two portions for passing the stalk laterally relative to the cover to the central opening 10. After the stalk is within opening 10, the two portions on opposite sides of line 13 will spring back together, or can readily be bent back to within the same plane, and the edges of the two portions will substantially engage each other along line 13, forming an imperforate plate except for opening 10 through which the stalk 7' of the plant extends. Since the passage 14 is most restricted adjacent the opening 10, a notch 15 may be made at the inner end of the cut along line 13, thus relieving the restriction at this point to insure a quick assemblage of the cover and can without injury to the stalk at the most restricted point along the passage, but with ordinary care an operator will generally have no difficulty, even without the notch.

Figure 2:
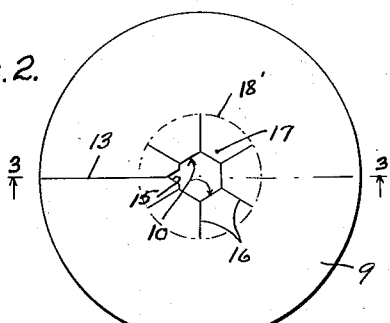
Fig. 2 is a plan view of the cover of the container.
Figure 3:
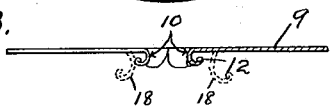
Fig. 3 is a sectional view of Fig. 2 taken along the line 3—3 thereof.

Since plant stalks vary in diameter and some being regular and others irregular in shape, I cut the cover through along relatively short lines 16 extending radially outwardly of the central opening 10. Portions 17 between the cuts along lines 16 are thus free to be bent downwardly to form flanges 18 extending in a general axial direction as indicated in dotted lines in Fig. 3, thus providing an enlarged central opening such as indicated in dotted line at 18' in Fig. 2, or one or more of the portions 17 can be bent as desired to accommodate an irregularly shaped stalk, and any variation of size and shape of opening may be had as desired. These cuts along lines 16 also tend to assist in the distribution of water to the plant roots as will later be described, since water may slowly seep through the cuts even when the edges of adjacent portions 17 are together.

It will be seen that with the cover disposed below the open end of the can, a secondary open receptacle is provided at the upper end of the can having as its bottom surface the upper side of the cover. This secondary receptacle is of a size adapted to receive substantially the proper amount of water to be absorbed by the peat and soil within the container without waste, and when the plants are in transit for say several weeks, or in storage in stores or warehouses, or are held preparatory to planting, an operator merely fills the secondary receptacle with water once in every four days, or a week, and the plant will stay in a healthy condition, and there is no resultant dirt from objectionable drainage, as occurs where the operator merely guesses as to how much water has been supplied to the plant. The water in the upper secondary receptacle gradually seeps to the peat and soil through the opening around the stalk and through the cuts along lines 16.

When it is desired to place the plant in the ground, the operator merely removes the bottom 2 and plants the can with the roots, peat and soil therein. The roots quickly take root through the open bottom and the can rusts away soon after it is enclosed in the ground. The inside of the can may be lightly tinned to resist rust from the inside and when the outside rusts away in the ground the tin disintegrates, or the inside may be coated with any suitable material to resist rusting of the can from the inside, although under average conditions, this need not be done.

The pot or container of Figs. 5 to 8 inclusive, is made of relatively tough fibreboard or cardboard preferably coated inside and out with paraffine, or it may be impregnated with paraffine or other suitable moisture-resistant material. Since this container closely resembles a box, it will be so termed to distinguish from the can which has already been described.

The body of the box comprises a single rectangular sheet of cardboard, of the character mentioned above, which is folded to provide a rectangular, tubular body with sides 20 joined in any suitable manner, as by riveting or with cement or glue along a side as at 21. Three of the sides of the body are extended at their lower ends at 22, 23, 23', the extension 22 being between the other two extensions and connected to the extensions 23, 23' respectively along its opposite side edges, the dotted lines in Fig. 5 most clearly showing the extensions, side 23' being in opposed relation to side 23 when extended and before folding. The extensions 23, 23' are cut off at their free corners at 24. The fourth, or remaining side of the box is extended at its lower edge to form a flap 25. Extensions 23, 23' are scored respectively along lines 26 extending diagonally from the corners of the tubular body adjacent the connections between sides 23, 23' with side 22 and all of the extensions, including flap 25, are adapted to fold along the lines of their junction with the sides of the box.

In folding, the extensions 23, 23' bend inwardly along score lines 26 and carry extension 22 in a direction to close the bottom end of the box and the outer end of flap 25 is then inserted directly next to and on the side of extension 22 between extension 22 and the doubled-in extensions 23, 23', thereby forming the bottom of the box. The flap 25 securely holds the extensions 22, 23, 23' in folded closed position and itself forms part of the bottom of the container. The bottom thus formed may be unfolded by withdrawing flap 25 preparatory to placing the plant roots with the box permanently in the ground.

After the bottom is closed as above described, the plant 6 is placed with its roots 7 in the box and the stalk 7' extending out of the open end. Soil and peat, or material as already described relative to the can of Fig. 1, is then packed around the roots and to about the top of the box.

The cover of the box comprises a rectangular sheet of material 28 of similar composition to that of the tubular body, which sheet has a central opening 30 therein and upstanding flanges 29 along its four edges. This cover is cut through along short lines 31 that extend radially from the opening 30, and the cover is also cut through along line 32 that extends radially from the opening 30 to the outer edge of the sheet and through one of the flanges 29. The relatively short slits or cuts 31 terminate short of the outer edges of the cover.

Figure 8:
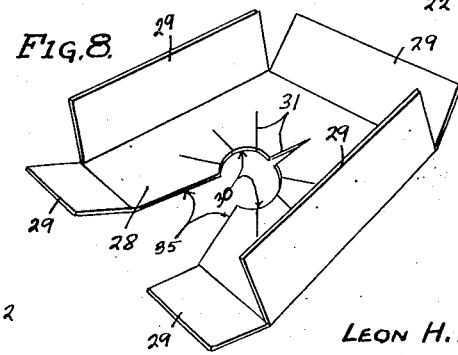
Fig. 8 is a perspective view of the cover sheet of Fig. 7 showing it slightly distorted for slipping around the plant stalk.

The cover of the form above described is adapted to be distorted in the same manner as the cover of the "can", best seen in Fig. 8, providing a passage 35 between portions on opposite sides of line 32 for passing the stalk to opening 30. The edges of the portions on opposite sides of the line 30 are then brought together and the cover is slipped into the open end of the container, the cover being shaped to snugly fit within the container with the flanges 29 adjacent the inner sides thereof. The cover is then pressed downwardly on top of the peat and soil, tightly compressing it around the roots of the plant, and the flanges are then respectively riveted to the sides of the container as at 36, securing the cover against withdrawal. It will be seen that I thus provide a cover and also a secondary receptacle above the cover for water similar to that in Fig. 1. The cuts 31 of the cover also provide for enlarging or modifying the shape of the central opening 30 to accommodate it to fit the stalk.

The box form of container has the advantage of being a pot that may be shipped flat and many can be stored in a small space.

While I am aware of the fact that attempts have been made to wrap plant roots and peat or other material in paper or burlap or to dip or coat material enclosing the roots in asphaltum or the like, such attempts naturally do not provide a container wherein ventilation to the roots is uniform. Some access of air to the roots must be maintained and the amount that is admitted between the bottom of my can or the bottom of the box is sufficient to keep the plant healthy, and yet the rate of evaporation of moisture from the peat and soil is so slow that the plant will remain healthy for many days without addition of moisture. This is very important where long shipments are made.

I also may lightly coat the exposed portion of the plants, after packing or before, by dipping the exposed portion in paraffine at a temperature of from 125° F. to 165° F., and the plants may be kept healthy, though dormant, for many months, but when planted at the proper season will take root immediately and commence to grow.

The fact that the containers, with the roots enclosed therein, are planted as a unit without removing the container but merely by opening the bottom, is very important in that when the small roots start to grow they are not exposed to the light and weather. This is not the case where packages are wrapped in paper or burlap, since in such packages the burlap or paper or similar enclosure must be unwrapped before planting and then the small white roots are exposed to light, when they will turn brown and stunt the growth of the plant or will actually keep it from growing.

Having described my invention, I claim:

1. A container for the root portion of a plant and including a tubular body closed at one end and open at the opposite end, a flexible closure disk adapted to close the open end and to be secured to the body, said disk being provided with a central opening and a slit extending from said opening to the edge of the disk whereby the portions of the disk at opposite sides of the slit may be distorted to provide a radially extending passage therebetween for passing a plant stalk to the central opening, said disk being further provided at the central opening with a flange extending in a general axial direction forming smooth sides to the opening for insuring against injury to the stalk.

2. A container for the root portion of a plant and including a tubular body closed at one end and open at the opposite end, a flexible closure disk adapted to close the open end and to be secured to the body, said disk being provided with a central opening and a slit extending from said opening to the edge of the disk whereby the portions of the disk at opposite sides of the slit may be distorted to provide a radially extending passage therebetween for passing a plant stalk to the central opening, said disk being further provided with a series of slots extending radially from the opening to provide a series of yieldable segments around the opening, said segments having their free inner ends bent in the direction of the closed end of the container.

3. A container for the root portion of a plant and including a tubular body closed at one end and open at the opposite end, a flexible closure disk adapted to close the open end and to be secured to the body, said disk being provided with a central opening and a slit extending from said opening to the edge of the disk whereby the portions of the disk at opposite sides of the slit may be distorted to provide a radially extending passage therebetween for passing a plant stalk to the central opening, said disk being further provided with a series of slots extending radially from the opening to provide a series of yieldable segments around the opening, said segments having their free inner ends bent in the direction of the closed end of the container, said inner ends of the segments being further bent outwardly away from the opening to insure against injury to the stalk.

4. A container for the root portion of a plant and including a tubular body closed at one end and open at the opposite end, a flexible closure disk adapted to close the open end and to be secured to the body, said disk being provided with a central opening and a slit extending from said opening to the edge of the disk whereby the portions of the disk at opposite sides of the slit may be distorted to provide a radially extending passage therebetween for passing a plant stalk to the central opening, said disk being further provided with a series of slots extending radially from the opening to provide a series of yieldable segments around the opening, said segments having their free inner ends bent in the direction of the closed end of the container and rolled to provide smoothly rounded beads at said inner ends.

LEON H. ELMER.